(12) United States Patent
Kono et al.

(10) Patent No.: US 6,427,029 B1
(45) Date of Patent: Jul. 30, 2002

(54) IMAGE SIGNAL PROCESSING METHOD AND DEVICE, AND STORAGE MEDIUM

(75) Inventors: Takahiko Kono; Shunichi Takeuchi; Nobuyuki Sashida, all of Yokohama (JP)

(73) Assignee: Custom Technology Corp. (JP)

( * ) Notice: Subject to any disclaimer, the term of this patent is extended or adjusted under 35 U.S.C. 154(b) by 0 days.

(21) Appl. No.: 09/108,046

(22) Filed: Jun. 30, 1998

(30) Foreign Application Priority Data

Aug. 28, 1997 (JP) .............................................. 9-233061

(51) Int. Cl.⁷ .............................. G06K 9/36; G06K 9/46
(52) U.S. Cl. ........................ 382/248; 382/233; 382/246; 382/251
(58) Field of Search ................................ 382/233, 246, 382/248, 250, 281, 274

(56) References Cited

U.S. PATENT DOCUMENTS 5,253,055 A * 10/1993 Civanlar et al. ............ 358/133

OTHER PUBLICATIONS

Gonzalez et al., "Digital Image Processing," pp. 398–402, Jun. 1992.*

* cited by examiner

*Primary Examiner*—Phuoc Tran
(74) *Attorney, Agent, or Firm*—Lerner, David, Littenberg, Krumholz & Mentlik, LLP

(57) ABSTRACT

An image compression and restoration technique may be used as a substitute for JPEG. In this technique, orthogonal transforms are performed on the original image signals without interpolation, which means it requires less calculation than JPEG standard. Furthermore, the degradation of the image quality can be suppressed. After that quantization, re-ordering and Huffman coding follow. The Huffman coding is also unique in the sense that unlike JPEG, it uses the data from the previous blocks which results in a more simple, less CPU intensive codec technique. Conversely, the compressed data is restored using a procedure reverse to that of the aforementioned compression technique.

36 Claims, 7 Drawing Sheets

FIG.3

$$\begin{pmatrix}
1 & 1 & 1 & 1 & 1 & 1 & 1 & 1 & 1 & 1 & 1 & 1 & 1 & 1 & 1 & 1 \\
1 & -1 & 1 & -1 & 1 & -1 & 1 & -1 & 1 & -1 & 1 & -1 & 1 & -1 & 1 & -1 \\
1 & 1 & 1 & 1 & 1 & 1 & 1 & 1 & -1 & -1 & -1 & -1 & -1 & -1 & -1 & -1 \\
1 & -1 & 1 & -1 & 1 & -1 & 1 & -1 & -1 & 1 & -1 & 1 & -1 & 1 & -1 & 1 \\
1 & 1 & 1 & 1 & -1 & -1 & -1 & -1 & -1 & -1 & -1 & -1 & 1 & 1 & 1 & 1 \\
1 & -1 & 1 & -1 & -1 & 1 & -1 & 1 & -1 & 1 & -1 & 1 & 1 & -1 & 1 & -1 \\
1 & 1 & 1 & 1 & -1 & -1 & -1 & -1 & 1 & 1 & 1 & 1 & -1 & -1 & -1 & -1 \\
1 & -1 & 1 & -1 & -1 & 1 & -1 & 1 & 1 & -1 & 1 & -1 & -1 & 1 & -1 & 1 \\
2 & 2 & -2 & -2 & 0 & 0 & 0 & 0 & 0 & 0 & 0 & 0 & 0 & 0 & 0 & 0 \\
2 & -2 & -2 & 2 & 0 & 0 & 0 & 0 & 0 & 0 & 0 & 0 & 0 & 0 & 0 & 0 \\
0 & 0 & 0 & 0 & 2 & 2 & -2 & -2 & 0 & 0 & 0 & 0 & 0 & 0 & 0 & 0 \\
0 & 0 & 0 & 0 & 2 & -2 & -2 & 2 & 0 & 0 & 0 & 0 & 0 & 0 & 0 & 0 \\
0 & 0 & 0 & 0 & 0 & 0 & 0 & 0 & 2 & 2 & -2 & -2 & 0 & 0 & 0 & 0 \\
0 & 0 & 0 & 0 & 0 & 0 & 0 & 0 & 2 & -2 & -2 & 0 & 0 & 0 & 0 & 0 \\
0 & 0 & 0 & 0 & 0 & 0 & 0 & 0 & 0 & 0 & 0 & 0 & 2 & 2 & -2 & -2 \\
0 & 0 & 0 & 0 & 0 & 0 & 0 & 0 & 0 & 0 & 0 & 0 & 2 & -2 & -2 & 2
\end{pmatrix}$$

FIG.4

| SCAN ORDER<br>BLOCK NUMBER | 0 | 1 | 2 | 3 | 4 | 5 | 6 | 7 | 8 | 9 | 10 | ... |
|---|---|---|---|---|---|---|---|---|---|---|---|---|
| N | 30 | 10 | 5 | 3 | 0 | 0 | 0 | 0 | 1 | 0 | 1 | ... |
| N+1 | 20 | 5 | 3 | 0 | 0 | 0 | 0 | 0 | 0 | 1 | 1 | ... |
| N+2 | 10 | 2 | 0 | 0 | 0 | 1 | 0 | 0 | 0 | 0 | 1 | ... |

FIG.5A

| N | (0*0, 30) (0*0, 10) (0*0, 5) (0*0, 3) (0*4, 1) (0*1, 1) ···(EOB) |
|---|---|
| N+1 | (0*0, 20) (0*0, 5) (0*0, 3) (0*6, 1) (0*0, 1) ···(EOB) |
| N+2 | (0*0, 10) (0*0, 2) (0*3, 1) (0*4, 1) ···(EOB) |

FIG.5B

| N | 30 | 10 | 5 | 3 | 0 | 0 | 0 | 0 | 1 | 0 | 1 | ... |
|---|---|---|---|---|---|---|---|---|---|---|---|---|
| N+1 | 20 | 5 | 3 | 0 | 0 | 0 | 0 | 0 | 0 | 1 | 1 | ... |
| N+2 | 10 | 2 | 0 | 0 | 0 | 1 | 0 | 0 | 0 | 0 | 1 | ... |

| N | 30 | 10 | 5 | 3 | 0 | 0 | 0 | 0 | 1 | 0 | 1 | ... |
|---|---|---|---|---|---|---|---|---|---|---|---|---|
| N+1 | 20 | 5 | 3 | 0 | ZRL | 0 | 1 | 1 | ... | | | |
| N+2 | 10 | 2 | 0 | 0 | 0 | 1 | ZRL | 0 | 1 | ... | | |

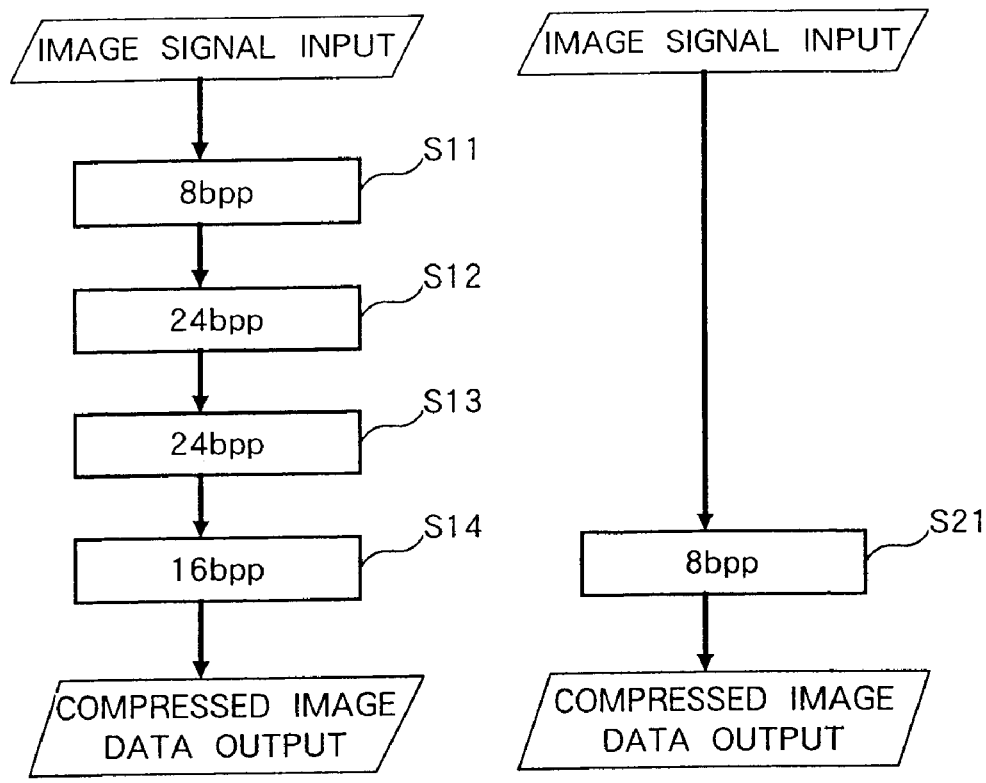
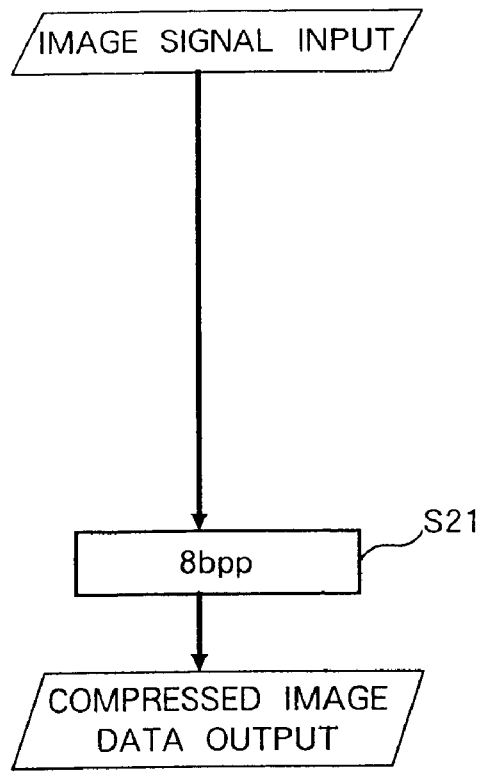
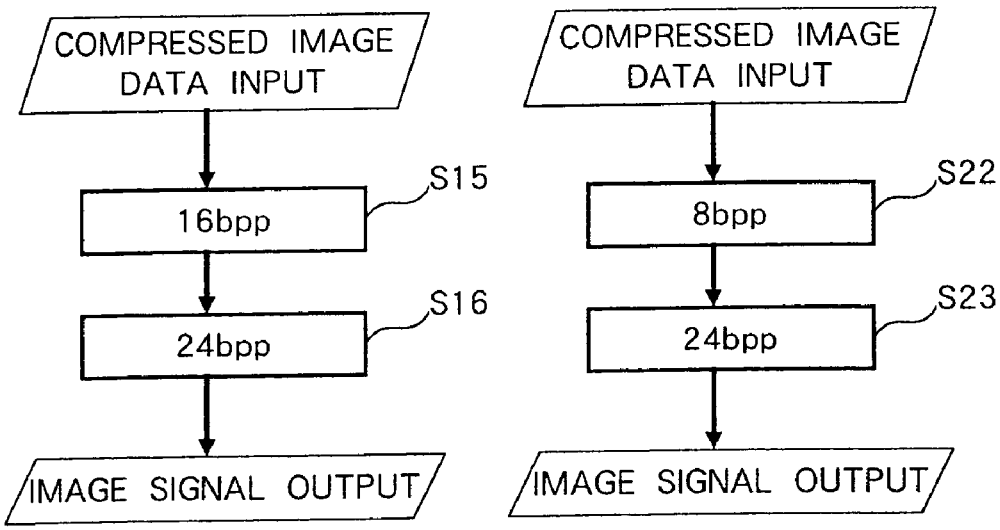
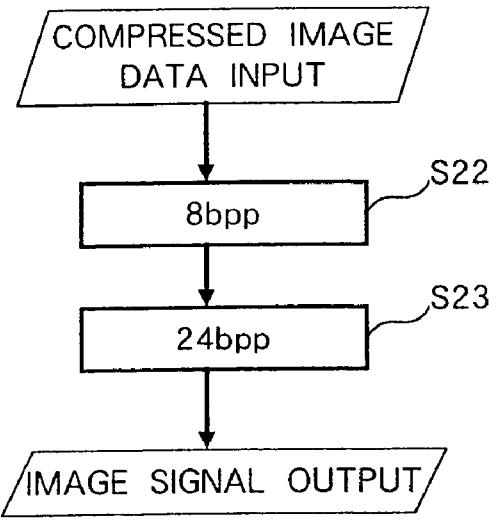

FIG.8 PRIOR ART

| G | R | G | R |
|---|---|---|---|
| B | G | B | G |
| G | R | G | R |
| B | G | B | G |

FIG.9 PRIOR ART

| RGB | RGB | RGB | RGB |
|-----|-----|-----|-----|
| RGB | RGB | RGB | RGB |
| RGB | RGB | RGB | RGB |
| RGB | RGB | RGB | RGB |

FIG.10 PRIOR ART

| Y | | Y | | Y | | Y | |
|---|---|---|---|---|---|---|---|
| Cb | Cr | Cb | Cr | Cb | Cr | Cb | Cr |
| Y | | Y | | Y | | Y | |
| Cb | Cr | Cb | Cr | Cb | Cr | Cb | Cr |
| Y | | Y | | Y | | Y | |
| Cb | Cr | Cb | Cr | Cb | Cr | Cb | Cr |
| Y | | Y | | Y | | Y | |
| Cb | Cr | Cb | Cr | Cb | Cr | Cb | Cr |

| SSSS | DC DIFFERENCE | NUMBER OF ADDITIONAL BITS |
|---|---|---|
| 0 | 0 | 0 |
| 1 | -1, 1 | 1 |
| 2 | -3,-2,2,3 | 2 |
| 3 | -7,...,-4,4,...,7 | 3 |
| 4 | -15,...,-8,8,...,15 | 4 |
| 5 | -31,...,-16,16,...,31 | 5 |
| 6 | -63,...,-32,32,...,63 | 6 |
| 7 | -127,...,-64,64,...,127 | 7 |
| 8 | -255,...,-128,128,...,255 | 8 |
| 9 | -511,...,-256,256,...,512 | 9 |
| 10 | -1023,...,-512,512,...,1023 | 10 |
| 11 | -2047,...,-1024,1024,...,2047 | 11 |
| 12 | -4095,...,-2048,2048,...,4095 | 12 |
| 13 | -8191,...,-4096,4096,...,8191 | 13 |
| 14 | -16383,...,-8192,8192,...,16383 | 14 |
| 15 | -32767,...,-16384,16384,...,32767 | 15 |

IMAGE SIGNAL PROCESSING METHOD AND DEVICE, AND STORAGE MEDIUM

BACKGROUND OF THE INVENTION

1. Field of the Invention

The present invention relates to image compression and reconstruction techniques that can be used for compressing a still picture in the form of image signals obtained by a digital still camera, a digital scanner or the like, transmitting the compressed image signals to a personal computer or the like, storing the compressed image signals, and expanding or decompressing the compressed image signals to restore or reconstruct the image signals on the personal computer or the like.

2. Description of the Prior Art

To capture natural images on personal computers, digital still cameras or digital scanners using single-plate CCD image sensors, have been used. These devices each contain an image compression device and a flash memory to compress and store image signals before transferring them to the personal computer. For the compression, a non-reversible or lossy compression method like JPEG, the international standard defined by the ISO/IEC 10918-1, is normally used.

A typical image compression device utilizing a lossy compression method comprises an interpolating section, an image component correcting section and an image compressing section. The interpolating section interpolates image signals outputted from a CCD image sensor so that each pixel has all the color components, which originally contains only one value of a color component, for example, R (red), G (green) or B (blue).

A typical structure of output signals of the CCD image sensor is shown in FIG. 8, while a structure of the image signals after the interpolation is shown in FIG. 9.

The image component correcting section carries out edge enhancement, white balance adjustment and gamma correction to the interpolated image signals. The edge enhancement is performed to the image signals if necessary. The white balance adjustment is performed to adjust the image signals to the characteristic of the human visual system. The gamma correction is performed to adjust the image signals to the characteristics of a display.

The image compressing section compresses the image signals outputted from the image component correcting section. With JPEG, when the image signals are in the form of the RGB, they are converted into luminance (Y)/color difference (Cb or Cr) signals as shown in FIG. 10. After the conversion into the luminance/color difference signals, a subsampling process is carried out to decimate the color difference signals. Thereafter, the signals are divided into blocks of 8 pixels by 8 pixels, and DCT (discrete cosine transform) is performed on each block. Then, the transformed coefficients are quantized and zig-zag scanned as shown in FIG. 12. From this pattern, each set of consecutive zeros is paired with the non-zero number that follows, and Huffman coded to accomplish entropy compression. In FIG. 12, each pair of numerical values represents coordinates of a corresponding pixel.

Moreover, JPEG is provided with an "escape code" followed by a pair of fixed length codes in order to avoid bloating of the Huffman table.

The transformed coefficients in each block consist of one DC, coefficient and sixty-three AC coefficients. In the foregoing example, the DC coefficient represents the upper-left coefficient and the AC coefficients represent the remaining sixty-three coefficients.

The DC coefficient is encoded in the following manner:

First, calculate the difference __d__ between the current DC coefficient and the previous DC coefficient. Second, obtain a group number (ssss) and the number of additional bits corresponding to the difference __d__ from the Huffman table shown in FIG. 11. The additional bits are used to uniquely identify the DC coefficient, e.g., the group number three has three additional bits. Then, output the Huffman coded group number and the additional bits.

On the other hand, the AC coefficients are first re-ordered, then a sequence of zeros followed by a non-zero number is replaced with a predetermined code, and then additional bits are outputted. For example, if number "7" follows after six zeros, a Huffman code representing "a run of six zeros followed by a value of the group number 3" is used. However, if there are more than 14 consecutive zeros, a code ZRL (zero run length) representing a run of 15 consecutive zeros is used. Further, a code EOB (end of block) is used if the subsequent coefficients are all zeros.

On the other hand, an image reconstruction device in the personal computer or the like receives the compressed image data produced by the image compression device and expands the data by means of reversing the compression routine. Namely, it decodes the two-dimensional Huffman codes, zig-zag positions the coefficients, dequantizes them and carries out the inverse DCT on them to reconstruct the luminance/color difference signals to reproduce the original image.

However, the foregoing conventional image signal processing technique has the following problems:

(1) It requires heavy calculations. Thus, it will take much time for compression and decompression.

As described above, in the conventional technique, the amount of data in the image signals outputted from the CCD image sensor are initially increased through interpolation. Hence, the calculation for the entropy compression will be extensive. For example, when each of the R, G and B signals of 8 bpp (bits per pel) is interpolated and converted to an RGB signal, it will become 24 bpp so that the data amount is tripled before compression. Furthermore, JPEG requires the following three complicated steps:

color space conversion, which uses a product-sum operation of decimal numbers;

DCT, which requires a large amount of calculation; and quantization of coefficients, which requires time consuming division.

(2) Since the color difference signals are decimated before compression, the image quality will be degraded upon reconstruction.

For example, one format adopted by JPEG is 4:2:2, which decimates the color difference signals and reduces the vertical resolution by ½. Therefore, image signals having 8 bpp originally, and hence 24 bpp (8,8,8) after interpolation, will be degraded to 16 bpp (8,4,4), once the 4:2:2 JPEG format is applied.

(3) Since JPEG doesn't acknowledge the correlation between the adjacent blocks, the efficiency of compression is reduced.

In other words, JPEG encodes and compresses each 8×8 block independently. Generally, the adjacent blocks in the natural image tend to have similar textures so that the coefficients after orthogonal transform, such as DCT, are likely to have similar values. Hence, JPEG is not optimizing the potential efficiency of the compression technique.

(4) Although the two-dimensional Huffman coding used in JPEG is efficient, it can not provide all the combinations of the two elements because it will cause bloating of the Huffman table. That is the reason why the escape code was introduced.

(5) The decoding process is complicated.

JPEG uses the two-dimensional Huffman table with a maximum of 16 bits, or in the case of escape coding, 28 bits. Hence, it requires the use of more than one lookup table to achieve high-speed decoding, which rendering the decoding process complicated.

SUMMARY OF THE INVENTION

Therefore, we present an improved image signal processing method that can eliminate one or more of the foregoing problems.

We further present an improved image signal processing device that can eliminate one or more of the foregoing problems.

We further present a storage medium that allows an electronic device, such as a device including a CPU (central processing unit), to carry out the foregoing improved image signal processing method.

Our improved image signal processing proceeds as follows:

First, we perform an image signal correction on each and every component of a given image, which is composed of the three primary colors—red, blue and green, or the three secondary colors—magenta (blue+red), yellow (red+green), and cyan (green+blue), or any tertiary colors, such as yellow+magenta, magenta+cyan, cyan+green, and green+yellow. Each pixel in an image is supposed to have _m_ bits (_m_ is a natural number) and have only one color. The image signal correction is composed of a gamma correction and a white balance adjustment. The second step is orthogonal transform, which is performed on a block basis. The third step is quantization and zig-zag scanning. And the last step is entropy coding.

What is unique about our technique is that it carries out the interpolation process after image decompression as opposed to the conventional technique that carries out the interpolation before image compression. Using this technique, we can avoid the image expansion and decimation before compression. However, without interpolation before compression, it becomes difficult to apply color space conversion that is required for efficient compression. To compensate for this, we adopted the color space conversion into the orthogonal transform.

The present invention includes a Huffman coding method that is performed on the transformed, quantized and re-ordered image signals.

With Huffman coding, a sequence of specific, consecutive codes in the subject block is represented by a predetermined, more concise code, provided that the same sequence appears in the same region of the previous block succeeded by a non-specific code. Conversely, in the Huffman decoding, the predetermined code in the subject block is replaced with a sequence of the specific codes, as long as the corresponding element in the previous block is the specific code.

The present invention provides an image signal compression and decompression device that performs the following:

1) dividing and preparing the inputted image signals into blocks.

2) orthogonal transform to each block, followed by quantization and re-ordering of elements in each block. The order of elements may be arranged to optimize compression efficiency.

3) Huffman coding that uses special codes that are used when:

i) from a certain point of the target block of an image, a specific code continues _n_ or more times (_n_ is a natural number), and ii) from the same point of the previous block of the same image, the specific code continues no more than _n_ times.

The two-dimensional 2×2 Hadamard transform can be used for the color space conversion of the image signals inputted from the single-plate CCD or the like.

As an orthogonal transform, an Hadamard transform, a Haar transform or an Hadamard-Haar transform may be applied, in which case, all the division processes can be replaced with bit shift operations to reduce the calculation amount.

In our new technique, the image signal processing method further comprises the steps of inputting and decoding the encoded image data, replacing the predetermined code in the subject block with a sequence of the specific codes, the number of which is determined by the previous block, re-positioning the elements in each block, and applying dequantization and inverse orthogonal transform to each block so as to reconstruct the original image.

The present invention further provides an image compression device comprising; quantizing means for quantizing image signals to obtain quantized data, code re-ordering means for re-ordering elements in each block of the quantized data, and encoding means for replacing a sequence of specific, consecutive codes in the subject block by a predetermined, more concise code, provided that the same sequence appears in the same region of the previous block proceeded by a nonspecific code, so as to produce compressed image data.

In our new method, an order of the elements produced by the reordering means is determined statistically so as to accomplish long runs of the specific codes.

The present invention further provides an image reconstruction device comprised of image data input means for inputting the compressed image data produced by the image compression device, and image decompressing means for replacing the predetermined code with a sequence of the consecutive specific codes, the length of which depends on the previous block.

The present invention further provides a storage medium storing a program which is readable and executable by an electronic device, the program allowing the electronic device to execute the steps of dividing image signals into a plurality of blocks, applying orthogonal transforms so as to obtain transformed data, quantizing the transformed data, re-ordering elements in each block of the quantized data, and encoding the re-ordered elements including a process of replacing a sequence of specific, consecutive codes in the subject block by a predetermined, more concise code, provided that the same sequence appears in the same region of the previous block succeeded by a non-specific code, so as to produce-compressed image data.

The present invention further provides a storage medium storing a program that is readable and executable by an electronic device. The program allows the electronic device to execute the following four steps; inputting the compressed image data produced by the image signal processing method, performing Huffman decoding for replacing the predetermined code in the subject block with a sequence of specific codes, re-positioning the elements in each block, and applying dequantization and an inverse orthogonal transform to each of the blocks so as to reconstruct the original image.

BRIEF DESCRIPTION OF THE DRAWINGS

The present invention will be understood more fully from the. detailed description given hereinbelow, taken in conjunction with the accompanying drawings.

In the drawings:

FIG. 3 is a diagram for explaining an orthogonal base matrix of a one-dimensional Hadamard-Haar transform to be used upon orthogonal transform in the image compression device according to the preferred embodiment of the present invention;

FIG. 4 is a diagram showing a portion of code blocks produced by a re-ordering section of the image compression device according to the preferred embodiment of the present invention;

FIG. 5A is a diagram for explaining a data state after the code blocks shown in FIG. 4 were compressed by JPEG;

FIG. 5B is a diagram for explaining the principle of compression of the code blocks shown in FIG. 4 according to the preferred embodiment of the present invention;

FIG. 5C is a diagram for explaining a data state after the code blocks shown in FIG. 4 were compressed according to the preferred embodiment of the present invention;

FIG. 6A is a diagram showing a transition in data size upon image compression according to JPEG;

FIG. 6B is a diagram showing a transition in data size upon image compression according to the preferred embodiment of the present invention;

FIG. 7A is a diagram showing a transition in data size upon image reconstruction according to JPEG;

FIG. 7B is a diagram showing a transition in data size upon image reconstruction according to the preferred embodiment of the present invention;

FIG. 8 is a diagram for explaining typical image signals outputted from a CCD image sensor;

FIG. 9 is a diagram for explaining a state of image signals after interpolation of the image signals shown in FIG. 8;

FIG. 10 is a diagram for explaining luminance/color difference signals obtained from the image signals shown in FIG. 9;

DESCRIPTION OF THE PREFERRED EMBODIMENT

Now, a preferred embodiment of the present invention will be described below with reference to the accompanying drawings.

In the preferred embodiment of the present invention, an image compression device is incorporated in an image processing device, such as a digital still camera, for compressing image data, and an image reconstruction device is realized by a personal computer, as an external device, for decompressing the compressed image data produced by the image compression device so as to reconstruct the image data.

Figure 1:
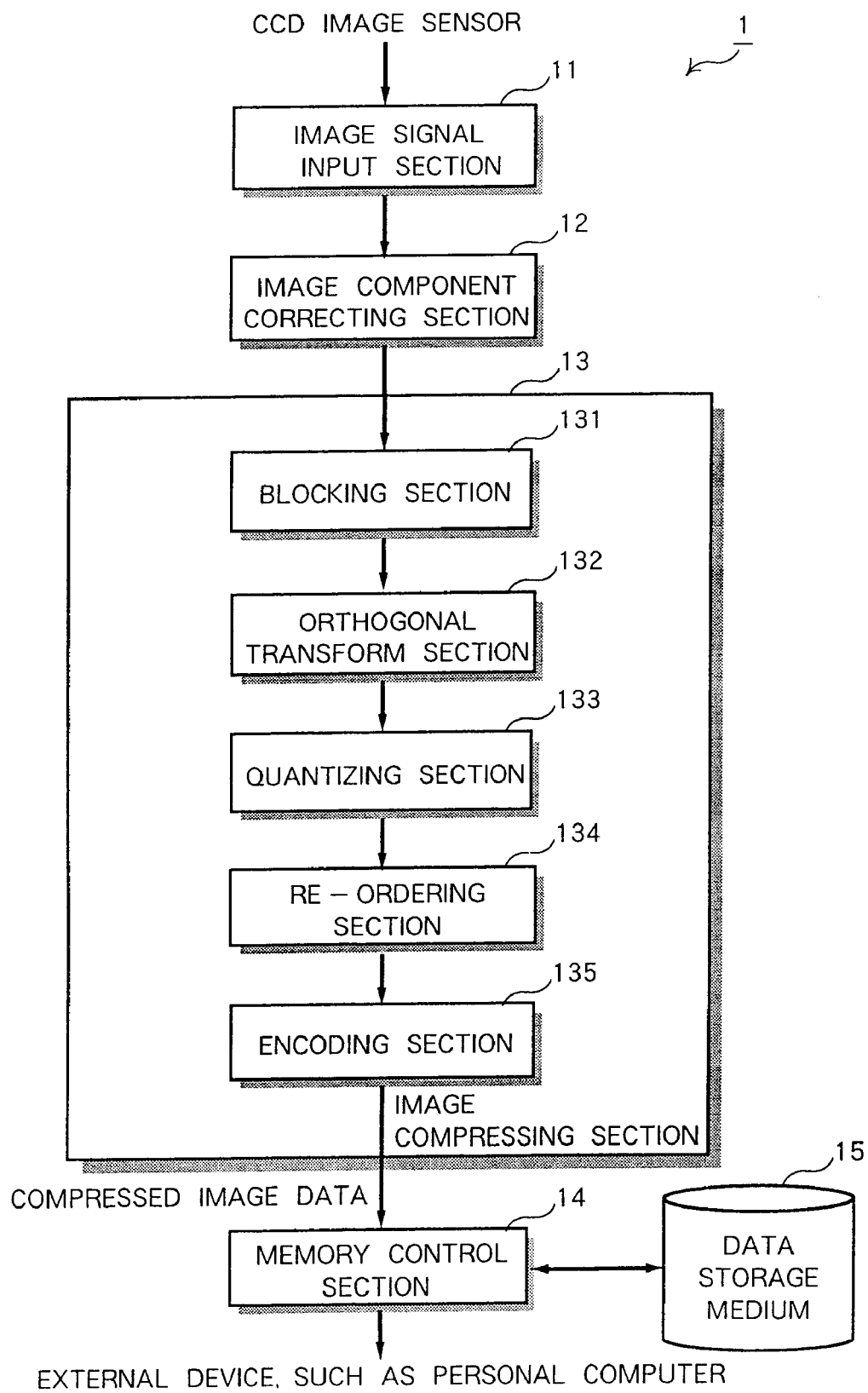
FIG. 1 is a functional block diagram showing a structure of an image compression device according to a preferred embodiment of the present invention.

FIG. 1 is a functional block diagram showing a structure of the image compression device (1) according to the preferred embodiment of the present invention.

The image compression device (1) comprises an image signal input, section (11), for receiving image signals which include color and luminance components from, for example, a single-plate CCD image sensor, and an image component correcting section (12) having the same function as that of the conventional device and carrying out component correcting processes, such as gamma correction, edge enhancement and white balance adjustment, relative to the received image signals. The device (1) further comprises an image compressing section (13) for compressing the component-corrected image signals to produce compressed image data, a data storage medium (15), such as a known flash memory, for storing the compressed image data, and a memory control section (14) for controlling data writing and reading relative to the data storage medium (15).

The image compressing section (13) comprises a blocking section (131) for dividing or grouping the image signals from the image component correcting section (12) into blocks, each including N×N (N is a natural number) pixels, an orthogonal transform section (132) for performing an N×N orthogonal transform with integer elements relative to each of the blocks, a quantizing section (133) for quantizing the resultant data of the orthogonal transforms, a re-ordering section (134) which scans the quantized resultant elements in each block and re-orders these elements to the order of the elements in the block in section (135). Section (135) is the encoding section for compressing the code blocks to produce compressed image data.

In practice, sections (131) to (135) are performed by a CPU (not shown) of an image processing device (e.g., a digital camera). The CPU reads out and executes a program stored in a ROM or a similar storage medium of the image processing device. In other words, the program storage medium gives the functions of the foregoing image compression device to an electronic device, such as an image processing device, incorporating a CPU.

It may be arranged that the compressed image data is directly transferred to the personal computer via a communication cable or the like without being once stored in the data storage medium (15). In which case, the known communication control means replaces the data storage medium (15) and the memory c control section (14).

Figure 2:
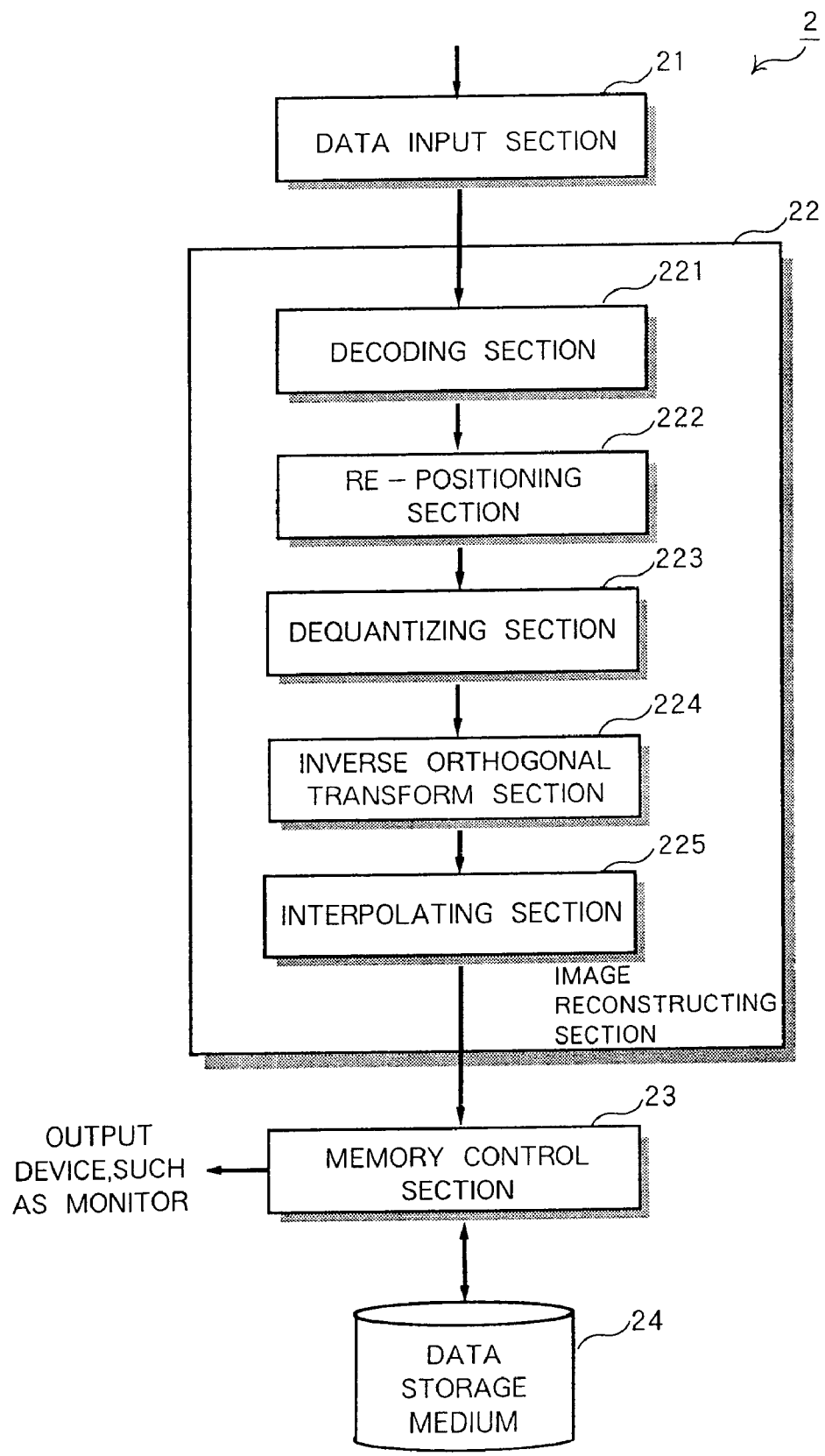
FIG. 2 is a functional block diagram showing a structure of an image reconstruction device according to the preferred embodiment of the present invention.
Figures 11, 12:
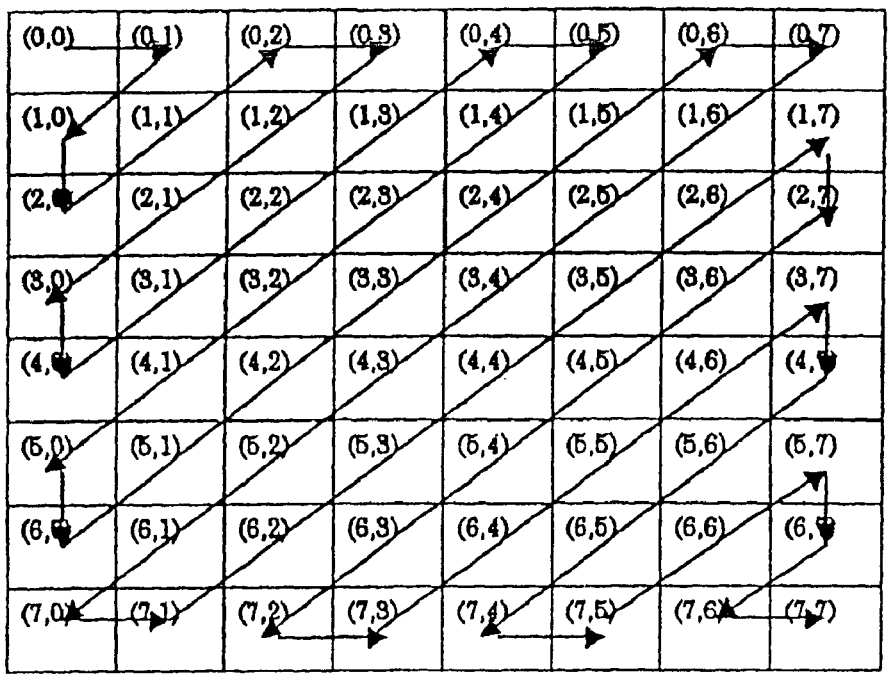
FIG. 11 is a diagram for explaining a table to be used upon encoding DC coefficients in JPEG.
FIG. 12 is a diagram for explaining zig-zag scanning to be carried out upon encoding AC coefficients in JPEG.

On the other hand, as shown in FIG. 2, the image reconstruction device (2) realized by the personal computer comprises a data input section (21) for inputting the compressed image data produced by the image compression device (1), an image reconstructing section (22) for reconstructing the image signals from the inputted compressed image data, a data storage medium (24), such as a hard disk, for storing the reconstructed image signals, and a memory control section (23) for controlling writing and reading of the image signals relative to the data storage medium (24).

The image reconstructing section (22) comprises a decoding section (221) for expanding or decompressing the compressed image data which corresponds to a procedure reverse to that of compression in order to obtain the code block in each N×N block, a re-positioning section (222) for re-positioning the codes in each N×N block, a dequantizing section (223) for dequantizing the re-positioned codes, an inverse orthogonal transform section (22) for carrying out inverse orthogonal transforms relative to the dequantized results so as to reconstruct the image signals (image blocks), and an interpolating section (225) for interpolating color pixel signals relative to the respective reconstructed image signals.

In practice, sections (221) to (225) are performed by a CPU (not shown) of a personal computer. The personal computer reads out and executes a program stored in a ROM, CD-ROM or other portable medium (not shown) functioning as a storage medium of the personal computer. In other words, the program storage medium gives the functions of the foregoing image reconstruction device to a personal computer functioning as a data processing device.

Now, the operations of the image compression device (1) and the image reconstruction device (2) will be described in more detail.

This preferred embodiment significantly differs from the conventional technique in that (1) in order to simultaneously satisfy the reduction of calculation amounts upon image compression and decompression and the prevention of image degradation upon image reproduction, the interpolation process is not carried out in the image compression device (1), but the image reconstruction device (2); and (2) in order to reduce calculation amounts upon image compression and reconstruction, the orthogonal transform section (132) carries out, for example, a Hadamard-Haar transform for color space conversion as an orthogonal transform and further, upon image compression a correlation between adjacent code blocks is utilized.

FIG. 3 shows a matrix representing the base of the orthogonal transform applied to each of the 16×16 blocks of the image signals according to the preferred embodiment of the present invention. This transform technique is called the Hadamard-Haar transform. In practice, the Hadamard-Haar transform (one dimensional) is executed in the vertical and horizontal directions, respectively, so as to be carried out two-dimensionally.

The reason for using the Hadamard-Haar transform in this preferred embodiment is that it was confirmed through experiments that the Hadamard-Haar transform achieved the compression efficiency approximate to that of the DCT with less calculation required. Furthermore, the results obtained by the Hadamard-Haar transform had the effect of color space conversion, as well as spatial redundancy reduction.

For example, when calculation of an 8×8 block is performed four times to process a 16×16 block by the DCT, over 400 multiplication and over 1,800 addition/subtraction calculations are necessary. On the other hand, in the Hadamard-Haar transform, all multiplication is eliminated so that 1,536 addition/subtraction and bit shift calculations are required for the calculation, significantly reducing the number of calculations compared to DCT. However, it is not necessarily required that an Hadamard-Haar transform be used for image compression; that is, a Hadamard transform or a Haar transform may be used instead of the Hadamard-Haar transform. Furthermore, the present invention is also applicable to compression using other orthogonal transforms, such as DCT as in JPEG, provided that a 2×2 Hadamard transform also is used for color space conversion. Incidentally, the number of multiplications and addition/subtractions required for an orthogonal transform relative to an 8×8 block were, respectively, 0 and 384 in the Hadamard transform, 32 and 320 in the Haar transform, and 64 (because it is possible to replace with bit shifts multiplication based on "2" and "–2" as shown in FIG. 3) and 256 in the Hadamard-Haar transform.

In an orthogonal transform, since its own inverse transform exists, data is never lost. However, the compression rate is normally controlled by dividing the resultant transform coefficients by values according to the target compression rate. Also in JPEG, the compression rate is adjusted through division of the DCT resultant transform coefficients. However, the division is a calculation with a very large load. Accordingly, in this preferred embodiment, the division required upon transformation is carried out by a right shift of data bits so as to obtain the scaled color/luminance image signals. This further reduces the calculation amount.

In this preferred embodiment, prior to the image compression, the re-ordering section (134) scans the output data from the quantizing section (133) in unique directions statistically determined so as to accomplish long runs of 0's (zero value coefficients) and produces the code block including 16×16 elements (coefficients) in each scanned block. The scan order depends on the type of the orthogonal transform. FIG. 4 shows a portion of the code blocks thus produced.

In the encoding section (135), these code blocks are efficiently compressed, for example, entropy compressed. For comparison, FIG. 5A shows an example wherein the code blocks shown in FIG. 4 are compressed by JPEG. In FIG. 5A, (0×0, 30) represents that a non-zero value coefficient "30" exists following no "0 (zero)", while (0×4, 1) represents that a non-zero value coefficient "1" exists following a run of four 0's. This manner of interpretation similarly applies to the others. Accordingly, in JPEG, a correlation between the adjacent code blocks is not considered. In FIG. 5A, (EOB) is a code representing no subsequent codes in the code block.

On the other hand, the encoding section (135) in this preferred embodiment considers a correlation between the subject code block and previous code block. Specifically, if the condition occurs where a region consists of consecutive zeros in the subject code block and consecutive zeros appear in the same region of the previous code block and are succeeded by a non-zero value, then this series of zeros in the subject code block is replaced with ZRL (zero run length).

For example, referring to FIG. 5B, presuming that the code block N+1 is the subject code block, the foregoing condition is satisfied at the coefficient region R1 (fifth to eighth coefficients) with respect to the previous code block N. Accordingly, a run of 0's in the coefficient region R1 is replaced with ZRL in the subject code block N+1. On the other hand, presuming that the code block N+2 is the subject code block, the foregoing condition is satisfied at the coefficient region R3 (seventh to ninth coefficients) with respect to the previous code block N+1. Accordingly, a run of 0's in the coefficient region R3 is replaced with ZRL in the subject code block N+2. On the other hand, although runs of 0's overlap with each other in a coefficient region R2 (fourth and fifth coefficients) between the adjacent code blocks N+1 and N+2, since the foregoing condition is not satisfied, the run of 0's in the coefficient region R2 can not be replaced with ZRL in the code block N+2. This is because, even if runs of 0's overlap with each other, if the foregoing condition is not satisfied, it becomes impossible to know how many 0's should be added upon decompression. In other words, if the foregoing condition is satisfied, the number of 0's to be added can be easily derived only by referring to the previous code block. FIG. 5C is a diagram showing compressed image data thus produced.

In the image reconstruction device (2), the image signals are reconstructed according to a procedure reverse to the compression procedure carried out in the image compression device (1). However, the decoding section (221) first develops the first code block (code block N in FIG. 4) into a string of the codes and then, any existing ZRL's in the subsequent code blocks are decoded with the corresponding numbers of 0's in sequence, respectively, by referring to the previous code blocks. In this manner, the original code blocks before compression are reconstructed.

Now, transitions in data size upon image compression and image reconstruction according to this preferred embodiment will be explained in comparison with JPEG. For convenience, it is presumed that the sizes of image signals from the CCD image sensor are 8 bpp in both cases.

FIG. 6A shows a transition in data size upon image compression according to JPEG, while FIG. 6B shows a transition in data size upon image compression according to this preferred embodiment.

In JPEG, after receiving the image signals of 8 bpp (S11), the interpolation process is immediately carried out to obtain the image signals of 24 bpp (S12). After the interpolation process, the interpolated signals are converted into the luminance/color difference signals Y/Cb,Cr maintaining 24 bpp (S13). Thereafter, the signals Y/Cb,Cr are decimated to 16 bpp and then compressed (S14). Thus, the compressed image data of 16 bpp is outputted. Accordingly, as described before, the load is large upon image compression and still the image quality is degraded.

On the other hand, in this preferred embodiment, after receiving the image signals of 8 bpp, the image signals are compressed maintaining 8 bpp (S21). Therefore, the degradation of the image quality is prevented and further the load upon image compression is reduced.

FIG. 7A shows a transition in data size upon image reconstruction according to JPEG, while FIG. 7B shows a transition in data size upon image reconstruction according to this preferred embodiment.

In JPEG, after the compressed image data is decompressed maintaining 16 bpp (S15), the decompressed data is converted into the RGB signals of 24 bpp so as to reconstruct the image signals (S 16). On the other hand, in this preferred embodiment, after the compressed image data is decompressed and the image signals are reconstructed maintaining 8 bpp (S22), the interpolation process is carried out to obtain the image signals of 24 bpp (S23). Thus, the load upon image reconstruction is reduced and further the image quality upon reproduction is enhanced as compared with JPEG.

As described above, in this preferred embodiment, the compression is carried out effectively utilizing the characteristic that the adjacent code blocks tend to have similar textures so that nonzero value coefficients are likely to appear at corresponding positions. Accordingly, with respect to the AC coefficient, the Huffman code can be formed with a half or less data size (8bits long at maximum) as compared with the 16-bit length (28-bit length when using the escape code) in JPEG. Further, in case of the 8×8 block, the decoding process can be efficiently performed only by preparing 256 elements so that the bloating of the Huffman table can be prevented. The handling of the DC coefficient is the same as in the conventional technique.

Since the image compression device (1) is principally characterized by replacing a run of 0's satisfying the foregoing condition with ZRL, the image signals are not necessarily color signals including color and luminance components. Therefore, the present invention is also applicable to monochromatic image signals.

In summary, according to the preferred embodiment of the present invention, the compression effect similar to the conventional technique can be achieved with significantly less calculation, and further, the degradation of the image quality can be suppressed.

While the present invention has been described in terms of the preferred embodiment, the invention is not to be limited thereto, but can be embodied in various ways without departing from the principle of the invention as defined in the appended claims.

What is claim is:

1. An image signal processing method comprising:
   1) an image compressing step comprising;
      i) edge enhancement, white balance adjustment and gamma correction,
      ii) an orthogonal transform performed on every block in an image for both color space conversion and spatial redundancy reduction,
      iii) quantization for scaling,
      iv) re-ordering of pixels in each block for effective coding, and
      v) Huffman coding utilizing data of the previous block, said Huffman coding comprising replacing original codes in a certain region of a subject block with a predetermined code on the condition that all the codes in the region are the same specific code and that all the codes in the same region of the previous block are also the same specific code and that the element succeeding _ n_ in the previous block is not the specific code.

2. An image signal processing method as in claim 1, further comprising an image decompressing step, said image decompressing step comprising;
   i) Huffman decoding,
   ii) re-positioning of the pixels in each block,
   iii) dequantization, and
   iv) an inverse orthogonal transform.

3. An image signal processing method as in claim 2, further comprising an interpolation step that is performed after the decompressing step.

4. An image signal processing method comprising:
   1) performing an orthogonal transform on an image signal;
   1) compressing said image signal, said compressing step comprising replacing original codes in a certain region of a subject block with a predetermined code on the condition that all the codes in the region are the same specific code and that all the codes in the same region of the previous block are also the same specific code and that the element succeeding _ n_ in the previous block is not the specific code.

5. An image signal processing method as in claim 4, further comprising an image signal decompressing step that replaces the predetermined code in the m th element of the subject block with a sequence of the specific code, the length of which is k, where codes in a region m, m+k-1 of the previous block are the same specific code and the (m+k) th element of the previous block is not the specific code.

6. An image signal processing method comprising the steps of:
   dividing image signals into blocks, applying an orthogonal transform to each block, quantizing every element in each of the transformed blocks, re-ordering the elements in each of the transformed and quantized blocks, and replacing a specific sequence of the elements in a subject block with a predetermined code if the specific sequence consists of the same specific code, the same region in the previous block also consists of the same specific code and the element succeeding the sequence in the previous block is not the specific code, so as to produce compressed image data.

7. The image signal processing method according to claim 6, wherein an order of the re-ordered elements is statistically determined in order to accomplish long runs of the specific code.

8. The image signal processing method according to claim 6, wherein the orthogonal transform performs color space conversion.

9. The image signal processing method according to claim 8, wherein the transform is performed two-dimensionally a the transform is a product of 2×2 Hadamard transform, which is for the color space conversion, and one of Hadamard transform, Haar transform and Hadamard-Haar transform, which is for spatial redundancy reduction.

10. The image signal processing method according to claim 9, wherein bit shifts are used to perform said transform instead of multiplication and division.

11. The image signal processing method according to claim 6, further comprising the steps of:
inputting and decoding said compressed image data, replacing the predetermined code in the subject block with a sequence of the specific code, the number of which is determined by the previous block, re-positioning the elements in each block, and applying dequantization and an inverse orthogonal transform to each block so as to reconstruct the original image signals.

12. A storage medium storing a program which is readable and executable by an electronic device, said program allowing said electronic device to execute the steps of:
inputting the compressed image data produced by the image signal processing method according to claim 6;
performing Huffman decoding for replacing the predetermined code in the subject block with a sequence of the specific code, the number of which is determined by the previous block, re-positioning the elements in each block, and applying a dequantization and an inverse orthogonal transform to each block so as to reconstruct the original image signals.

13. An image compression device comprising:
orthogonal transform means for performing an orthogonal transform on image signals;
quantizing means for quantizing said image signals to obtain quantized data;
code re-ordering means for re-ordering elements in each block of the quantized data; and
encoding means for replacing a sequence of a consecutive specific code in a subject block with a predetermined code when the same region of the previous block is also a sequence of the consecutive specific code and the next element of the previous block is not the specific code, so as to produce compressed image data.

14. The image compression device according to claim 13, wherein an order of the elements produced by said re-ordering means is determined statistically so as to accomplish long runs of said specific code.

15. An image reconstruction device comprising:
image data input means for inputting the compressed image data produced by the image compression device according to claim 13; and
image decompressing means for replacing the predetermined code with a sequence of the consecutive specific codes, the length of which depends on the previous block.

16. A storage medium storing a program which is readable and executable by an electronic device, said program allowing said electronic device to execute the steps of:
dividing image signals into a plurality of blocks;
applying an orthogonal transform to each of the blocks so as to obtain transformed data;
quantizing the transformed data;
re-ordering elements in each of the blocks; and
performing Huffman coding for replacing a sequence of consecutive specific codes with a predetermined code, provided that the corresponding elements in the previous block are the same specific codes and that the next element in the previous block is not the specific code, so as to produce compressed image data.

17. A method for compressing an image signal to form a compressed image signal, said image signal comprising a first sequence of blocks including a first subject block and a first previous block and said compressed image signal comprising a second sequence of blocks including a second subject block and a second previous block, said method comprising:
performing an orthogonal transform on said image signal;
creating said compressed image signal, said creating comprising replacing with a predetermined code a sequence of codes in a first region of said first subject block when all of conditions (a), (b) and (c) occur, condition (a) being all of the codes in said first region are the same code, condition (b) being all of the codes in a second region of said first previous block also are the same code, said second region corresponding to said first region, and condition (c) being the first code succeeding said second region of said first previous block is not the same code.

18. A method as in claim 17, wherein said same code is zero.

19. A method as in claim 17, wherein said same code is a number other than zero.

20. A method for compressing an image signal as in claim 17, further comprising recreating said image signal, said recreating comprising replacing said predetermined code at a position n in said second subject block with a number of elements, each of said elements being said same code, said number being determined on the basis of the number of elements in said second previous block beginning with the element at the position of said second previous block which corresponds to the positionn and ending with the element immediately before the first element following said position of said second previous block which is not said same code.

21. A method as in claim 20, wherein said number equals said number of elements.

22. A system for compressing an image signal to form a compressed image signal, said image signal comprising a first sequence of blocks including a first subject block and a first previous block and said compressed image signal comprising a second sequence of blocks including a second subject block and a second previous block, said system comprising:
means for performing an orthogonal transform on said image signal;
means for creating said compressed image signal, said means for creating comprising means for replacing with a predetermined code a sequence of codes in a first region of said first subject block when all of conditions (a), (b) and (c) occur, condition (a) being all of the codes in said first region are the same code, condition (b) being all of the codes in a second region of said first previous block also are the same code, said second region corresponding to said first region, and condition (c) being the first code succeeding said second region of said first previous block is not the same code.

23. A system as in claim 22, wherein said same code is zero.

24. A system as in claim 22, wherein said same code is a number other than zero.

25. A system for compressing an image signal as in claim 22, further comprising means for recreating said image signal, said means for recreating comprising means for replacing said predetermined code at a position n in said second subject block with a number of elements, each of said elements being said same code, said number being determined on the basis of the number of elements in said second previous block beginning with the element at the position of said second previous block which corresponds to the position n and ending with the element immediately before the first element following said position of said second previous block which is not said same code.

26. A system as in claim 25, wherein said number equals said number of elements.

27. A system for compressing an image signal to form a compressed image signal, said image signal comprising a first sequence of blocks including a first subject block and a first previous block and said compressed image signal comprising a second sequence of blocks including a second subject block and a second previous block, said system comprising:

a processor adapted to perform an orthogonal transform on said image signal and to create said compressed image signal by replacing with a predetermined code a sequence of codes in a first region of said first subject block when all of conditions (a), (b) and (c) occur, condition (a) being all of the codes in said first region are the same code, condition (b) being all of the codes in a second region of said first previous block also are the same code, said second region corresponding to said first region, and condition (c) being the first code succeeding said second region of said first previous block is not the same code.

28. A system for compressing an image signal as in claim 27, further comprising a second processor, said second processor being adapted to recreate said image signal by replacing said predetermined code at a position n in said second subject block with a number of elements, each of said elements being said same code, said number being determined on the basis of the number of elements in said second previous block beginning with the element at the position of said second previous block which corresponds to the position n and ending with the element immediately before the first element following said position of said second previous block which is not said same code.

29. A system as in claim 28, wherein said number equals said number other than zero.

30. A system as in claim 27, wherein said same code is zero.

31. A system as in claim 28, wherein said number equals said number of elements.

32. A computer readable medium having computer executable software stored on said medium, said computer executable software being for compressing an image signal to form a compressed image signal, said image signal comprising a first sequence of blocks including a first subject block and a first previous block and said compressed image signal comprising a second sequence of blocks including a second subject block and a second previous block, said computer executable software comprising software for:

performing an orthogonal transform on said image signal; and creating said compressed image signal by replacing with a predetermined code a sequence of codes in a first region of said first subject block when all of conditions (a), (b) and (c) occur, condition (a) being all of the codes in said first region are the same code, condition (b) being all of the codes in a second region of said first previous block also are the same code, said second region corresponding to said first region, and condition (c) being the first code succeeding said second region of said first previous block is not the same code.

33. A computer readable medium as in claim 32, further comprising a second computer readable medium having further computer executable software stored on said second medium, said further computer executable software being for recreating said image signal, said further computer executable software comprising software for replacing said predetermined code at a position n in said second subject block with a number of elements, each of said elements being said same code, said number being determined on the basis of the number of elements in said second previous block beginning with the element at the position of said second previous block which corresponds to the position n and ending with the element immediately before the first element following said position of said second previous block which is not said same code.

34. A system as in claim 33, wherein said number equals said number of elements.

35. A system as in claim 32, wherein said same code is zero.

36. A system as in claim 32, wherein said same code is a number other than zero.

* * * * *

UNITED STATES PATENT AND TRADEMARK OFFICE
CERTIFICATE OF CORRECTION

PATENT NO.     : 6,427,029 B1
DATED          : July 30, 2002
INVENTOR(S)    : Takahiko Kono, Shunichi Takeuchi and Nobuyuki Sashida It is certified that error appears in the above-identified patent and that said Letters Patent is hereby corrected as shown below:

<u>Title page,</u>
Item [57], ABSTRACT,
Line 6, a comma should be added after the word "that."

<u>Column 1,</u>
Line 64, cancel the comma after "DC."

<u>Column 6,</u>
Line 50, cancel the letter "c" after the word "memory."

<u>Column 10,</u>
Line 57, "m, m+k-1" should read -- [m, m+k- 1] --.

<u>Column 11,</u>
Line 14, "a" should read -- and --.

<u>Column 12,</u>
Line 47, "positionn" should read -- position n --.

Signed and Sealed this

Twenty-fifth Day of February, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,427,029 B1  Page 1 of 1
DATED        : July 30, 2002
INVENTOR(S)  : Takahiko Kono, Shunichi Takeuchi and Nobuyuki Sashida It is certified that error appears in the above-identified patent and that said Letters Patent is hereby corrected as shown below:

<u>Column 14,</u>
Line 1, "28" should read -- 27 --.
Line 1, "number equals said" should read -- same code is a --.

Signed and Sealed this

Eleventh Day of May, 2004

JON W. DUDAS
*Acting Director of the United States Patent and Trademark Office*